Jan. 8, 1935.  C. J. RORDELL  1,987,027
CULTIVATOR
Filed July 26, 1933
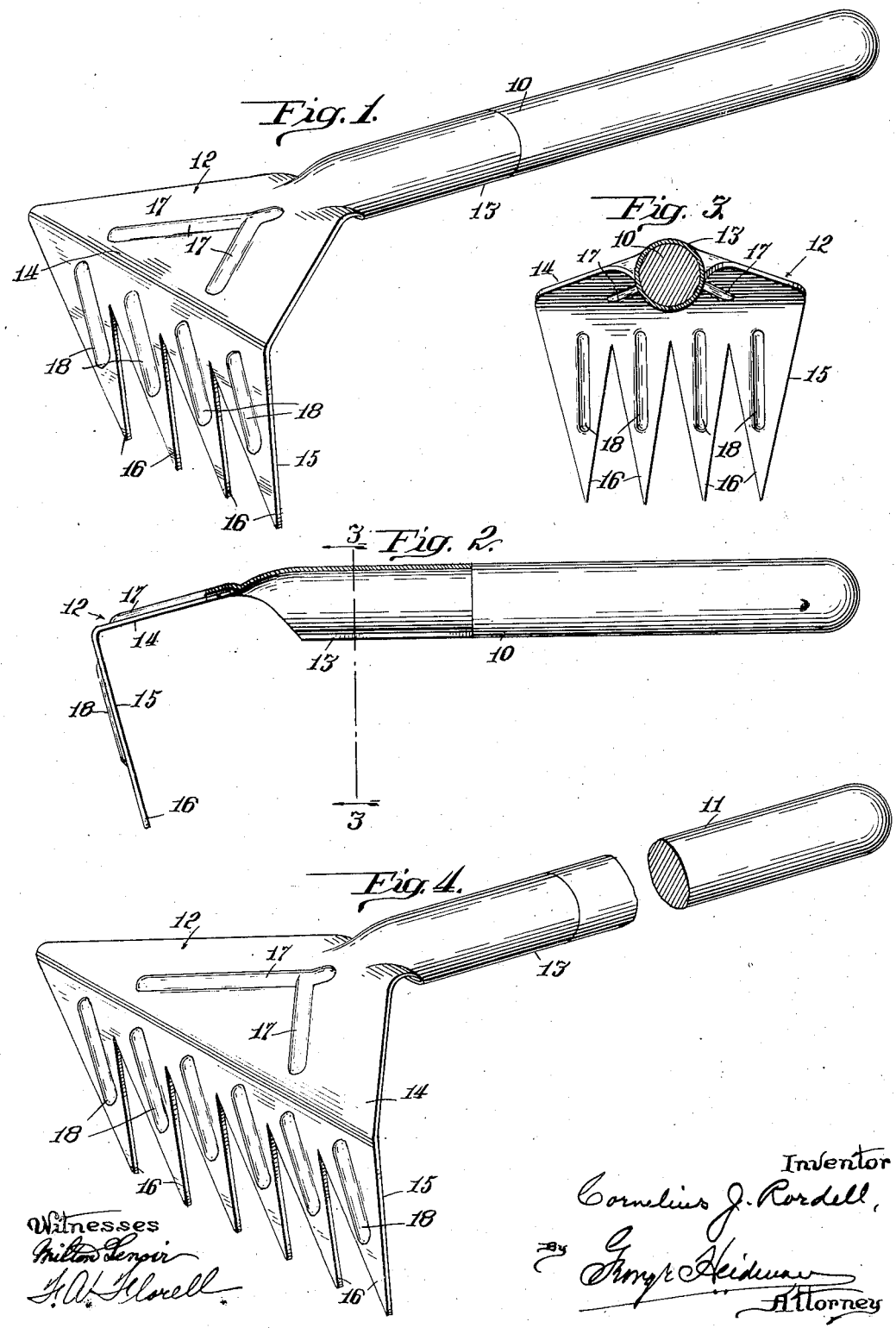

Patented Jan. 8, 1935

1,987,027

UNITED STATES PATENT OFFICE 1,987,027

CULTIVATOR

Cornelius J. Rordell, Salt Lake City, Utah

Application July 26, 1933, Serial No. 682,214

3 Claims. (Cl. 97—66)

My invention relates to hand cultivators, whether of the one hand type or the two hand type, the constructions, except size, being substantially alike.

The invention has for its object the provision of a cultivator of greater efficiency than hand cultivators as heretofore made; at the same time providing an implement equally well adapted as a weeder because of its construction whereby it is capable to pull at the roots of the weeds; while at the same time providing an implement which is also intended for use as a hoe.

The objects and advantages of my invention, as well as the structural features by means of which these objects are attained, will be readily comprehended and understood from the following detailed description of the accompanying drawing, wherein:

Figure 1 is a perspective view of my improvements embodied in a one-hand cultivator.

Figure 2 is a longitudinal sectional view of the cultivator as shown in Figure 1.

Figure 3 is a sectional elevation taken substantially on the line 3—3 of Figure 2, looking in the direction of the arrows.

Figure 4 is a perspective view of my invention in the form of a two hand cultivator; an intermediate portion of the handle being broken away.

My invention relates to the construction of a hand cultivator which is adapted for use in cultivating and furrowing—or in hoeing—or in weeding; these functions being the result of the construction of the head of the implement whereby the free edge or end of the head is arranged in a predetermined relation to the attached end thereof and the relation of the latter to the handle of the implement, whether the handle is of the short or one hand type as shown at 10 in Figures 1 and 2; or the handle is of the long or two hand type shown at 11 in Figure 4.

The head or work blade portion 12 of the implement is preferably made of a suitable blank of sheet metal or steel to provide a one piece structure comprising the ferrule or handle receiving end 13 into which the handle 10 may be forced and riveted or otherwise suitably secured.

The upper portion 14 of the head or blade 12, as will be seen in Figures 1 and 2, is arranged at a predetermined angle relative to the longitudinal axis of the ferrule 13 and the handle 10, so as to be disposed in a sloping manner toward one side of the longitudinal axis; while the free or cutting end 15 of the blade is arranged at a predetermined angle relative to the plane of the portion 14.

I have found in actual practice that the efficiency of the implement depends upon the proper relation or directional disposition of these portions of the head or blade and therefore, as an exemplification, I show the upper portion 14 of the head or blade arranged approximately at an angle of fifteen degrees relative to the plane of the longitudinal axis of the handle 10; while the free end 15 of the blade is disposed approximately at a ninety degree angle relative to the plane of the portion 14 of the blade. These angles may vary a few degrees one way or the other; the invention, however, involving the disposition of the portion 14 at a proper acute angle relative to the axis of the handle and the disposition of the portion 15 substantially at right angles, preferably not less than ninety degrees relative to portion 14. That is to say, the part 15 should preferably be arranged at an angle approximating a right angle relative to the plane of part 14, thus causing the end portion 15 to be disposed at an acute angle relative to the longitudinal axis of the handle 10, as is clearly apparent from the disclosure made in Figure 2.

The portion 15 is provided with a plurality of teeth 16 which also are preferably cut in a predetermined manner; that is to say these teeth are cut at approximately a twenty degree angle relative to the vertical axis of the teeth thus providing the comparatively long pointed teeth 16 and resultant long slots as more clearly shown in Figure 3. These teeth make an efficient weeder and also cultivator of the implement.

The various angles, or approximately the angles mentioned, give the implement its efficiency as a cultivator and enable it to pull weeds by the roots, while the shape greatly aids in furrowing for planting and for ditching. By turning the implement on its side the cultivator may then be used as a hoe, because the sides of the portion 14, tapering toward the ferrule 13 and the sloping side of the side tooth 15, provides a double shearing surface on opposite sides of the more or less sharp point produced at the juncture between portions 14 and 15.

It will be understood, of course, that instead of the sharp or angular bend between the portions 14 and 15, the juncture between these portions may be more or less arcuate, with the main parts of these portions arranged substantially at the angles heretofore set forth.

With the blade made of sheet metal, I prefer to provide the blade with reenforcing ribs; the portion 14 being shown provided with the ribs 17, 17, extending from a point adjacent to the end of the ferrule portion and diverging in lines more or less parallel with the flaring sides of the portion 14; while each tooth 16 is shown provided with a reenforcing rib 18 substantially at the median line of the tooth and preferably terminating at a disstance removed from the point of the tooth.

The vents between the teeth are preferably cut at less than thirty degrees as shown as I find that they not only more readily grip the weeds and hence enable them to be pulled, but they also more readily slip or release the weeds after they have been pulled.

In Figure 4 I illustrate a two-hand cultivator, which, except as to length of the handle 11 and greater number and length of teeth, is of the same construction as the one-hand cultivator shown in Figure 1 and heretofore described.

I have more or less specially defined my improved blade as consisting of an upper portion preferably arranged at a fifteen degree decline relative to the longitudinal axis of the handle and the lower portion preferably arranged at not less than a right angle or ninety degrees relative to the plane of the upper portion, but it will be understood that slight deviations from these degrees may be made in one way or the other and that the disposition of the blade portions relative to each other may be accomplished by curving the blade, without departing from the spirit of my invention; the terms employed being used for purposes of description and not as terms of limitations.

What I claim is:

1. A cultivator of the character described comprising a handle; and a blade composed of a single metal sheet formed to provide a handle-receiving ferrule at one end, a straight upper blade portion arranged at a downward inclination relative to the ferrule end and a straight lower portion disposed in a rearward direction substantially at right angles to the upper portion, the two portions extending equal distances on opposite sides of the longitudinal axis of the handle and constituting a cutting edge, the lower portion at its free edge having cut-out portions tapering toward the upper portion at a prearranged degree to provide a plurality of long triangular shaped teeth of equal width and length.

2. A cultivator of the character described comprising a handle, a blade having an upper portion arranged at a downward inclination relative to the handle and a lower portion disposed downwardly in a rearward direction, the upper blade portion and lower blade portion gradually increasing in width toward the juncture between said portions so that opposite side edges of the blade portions will constitute V-shaped cutting edges; and means whereby the blade is secured to the handle.

3. A cultivator of the character described comprising a handle; and a single piece blade formed to provide a handle attaching portion, a straight upper portion arranged at a downward inclination relative to the longitudinal axis of the handle and a straight lower portion arranged at a predetermined angle relative to the plane of the upper portion so as to extend in a rearward direction, the side edges of both the upper and the lower portions constituting a cutting edge with the juncture between the two portions protruding in advance of the other portions of the cutting edge, while the free end of the lower portion is cut out to provide triangular shaped teeth of equal width and length, with the vents between the teeth cut at less than forty-five degrees.

CORNELIUS J. RORDELL.